W. G. TURNER.
DEVICE FOR HOLDING BALE TIES WHILE BEING COUPLED.
APPLICATION FILED JUNE 1, 1918.
1,332,648.  Patented Mar. 2, 1920.
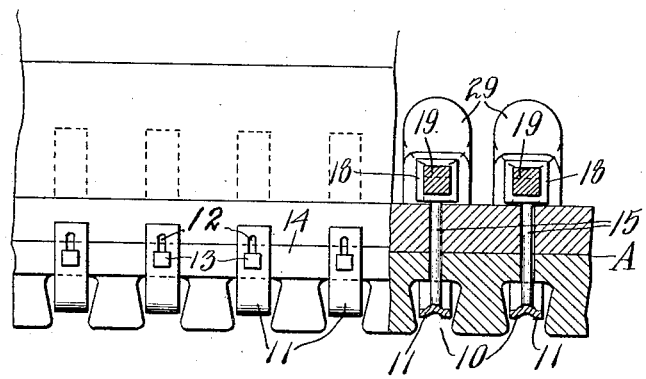
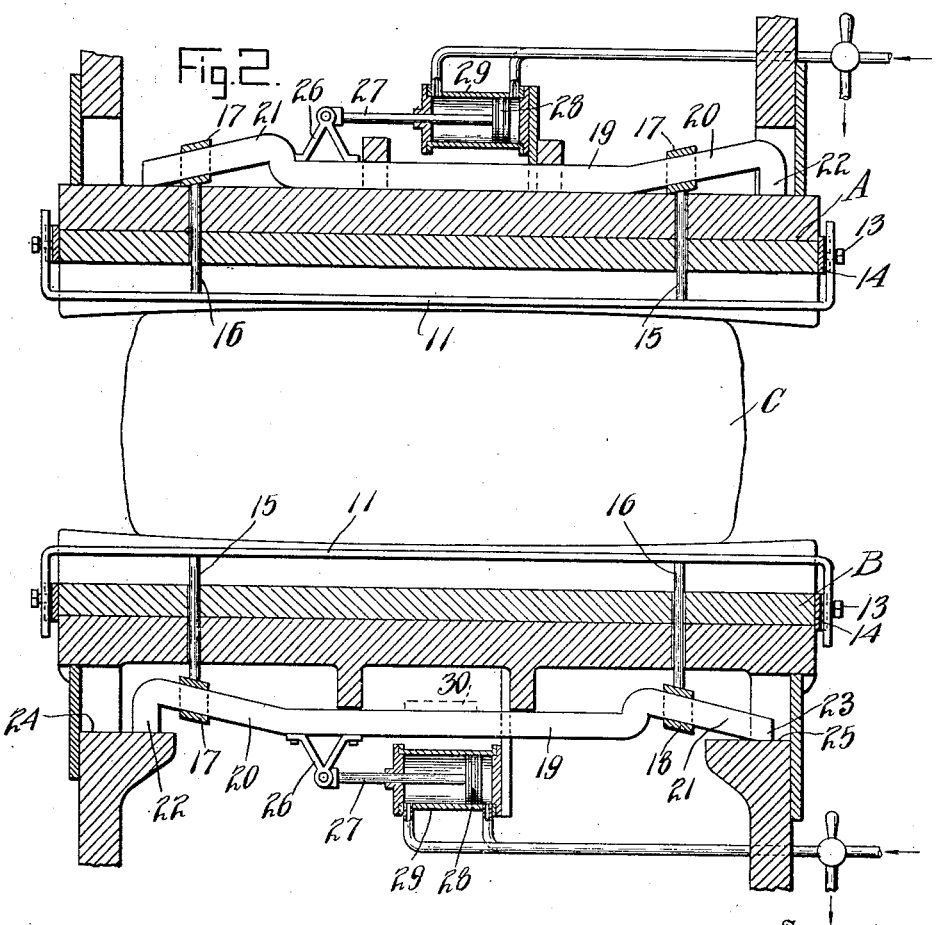
Inventor
William G. Turner

UNITED STATES PATENT OFFICE.

WILLIAM GRUBB TURNER, OF MEMPHIS, TENNESSEE.

DEVICE FOR HOLDING BALE-TIES WHILE BEING COUPLED.

1,332,648. Specification of Letters Patent. Patented Mar. 2, 1920.

Application filed June 1, 1918. Serial No. 237,736.

*To all whom it may concern:*

Be it known that I, WILLIAM GRUBB TURNER, a citizen of the United States, residing at Memphis, Shelby county, and State of Tennessee, have invented and discovered certain new and useful Improvements in Devices for Holding Bale-Ties while Being Coupled, of which the following is a specification.

My said invention consists in the construction and arrangement of mechanism for retaining bale ties while their ends are being coupled or secured together as in the operations of baling cotton, or repressing cotton at a cotton compress, whereby the expansion or relaxation of the tie is avoided during such operation and the undue expansion of the bale when released from the jaws of the compress is prevented, all of which will be hereinafter more fully described and claimed.

Referring to the accompanying drawings which are made a part hereof, and on which similar characters indicate similar parts, Figure 1 is a front edge view partly in section and partly in elevation of a portion of a platen of a cotton compress showing my invention as applied thereto, and Fig. 2 a cross section through the platens of a compress with a bale of cotton indicated between said platens.

In said drawings the portions marked A represent the upper platen, B the lower platen, and C the bale of cotton.

The compress shown is in the main of a common and well known type and requires no special description. Each of the platens is formed with a series of transverse channels 10 as is usual. In each of these channels I mount a movable filler bar 11 which is adapted to slide in said channel, toward and from the floor thereof. Each filler bar is formed of a width substantially corresponding to the width of the mouth of the channels and of a length slightly greater than the width of the platen with each end bent at right angles to the main direction of the filler bar and having slots in said ends, as shown in Fig. 1 which engage over pins 13 projecting into the edge of the platen or bars 14 mounted on the edge of the platen. Each of said filler bars is mounted on a pair of rods 15 and 16 which extend at right angles thereto through perforations in the platen and jaw of the compress and have sleeves 17 and 18 on their other ends, said sleeves being formed with angular or inclined openings as clearly indicated in Fig. 2, reciprocating bars 19 are mounted above the upper platen of the compress and below the lower platen of the compress having angular portions 20 and 21 which extend through the sleeves 17 and 18 of the bar 19. The extreme ends 22 and 23 of said bars rest upon ledges or in recesses 24 and 25 in the sides of the platens of the compress and are adapted to slide back and forth thereon. Each of said bars is connected by means of a bracket 26 to a piston-rod 27 having a piston 28 mounted within a cylinder 29 which cylinder is connected to compressed air or steam power supply in any appropriate manner, it being thought unnecessary to illustrate such connections, which are common in the arts.

There may be a separate operating cylinder 29 for each of the bars 19 and filler bars 11, or all of the bars may be connected as by a connecting cross bar 30, indicated by dotted lines in the lower part of Fig. 2. When so connected a single power cylinder is sufficient to operate the series of bars in unison. When each is provided with its independent power cylinder, each bar 11 will be operated independently which I regard as a preferable arrangement.

In use the manipulator inserts the bale ties around the bale of cotton after being compressed, threading the same through the channels 10 between the filler bars 11 and the surface of the bale. The manipulator draws upon the projecting free ends of each tie until its rear and sides are tightly against the bale of cotton when by turning a controlling air or steam valve, not shown, the piston 28 is operated in cylinder 29 to slide the bar 19 so that it operates through the inclined portions 20 and 21, in a wedge-like manner, to press the bar 11 on each side of the bale against the ties and clamp them between said bars and the sides of the bale and prevent them from expanding or relaxing under their own resiliency during the process of buckling. It will be understood that the cylinders 29 operating the bars 19 and filler bars 11 in corresponding opposite channels may be manipulated through the manipulation of a single valve and thus both operated in unison.

When all of the bars are connected to be operated by a single power cylinder the several manipulators will hold the bands taut while the power is turned on for the clamping of the ties.

By this means the relaxation in the density of the bale after being tied, which is a result unavoidable by the usual method of baling cotton or tying the bales after being repressed, is to a much larger degree avoided and a very much higher density in the bale is maintained than is possible under such usual methods of procedure, with the consequent result that the same quantity and weight of cotton is compressed into a bale of smaller size and a material saving in space for storing and shipping secured as well as an advantage in handling because of the less bulky bales.

Having thus fully described my said invention what I claim as new and desire to secure by Letters Patent, is:

1. The combination with a cotton compress of filler bars mounted in the channels of the platens thereof, each filler bar being connected to a sliding member arranged to move said filler bars toward and from the normal face of the platen, and means connected with said sliding members for operating them, substantially as set forth.

2. The combination with a cotton press of platens formed with channels, filler bars mounted in said channels, reciprocating members on opposite sides of said platens formed with inclined or wedge-like portions, connections extending from said filler bars to the inclined portions of said reciprocating members whereby the reciprocation of said members moves said filler bars toward and from the normal face of the platen, and power cylinders connected by means of a piston to said reciprocating members for operating them, substantially as set forth.

3. A cotton compress having platens with transverse channels, filler bars mounted in said channels to move toward and from the face of the platens, bodily moving means for operating said bars outwardly, and power mechanism for operating said bodily moving means.

In witness whereof I have hereunto set my hand and seal at Washington, District of Columbia, this twenty-third day of May, A. D. nineteen hundred and eighteen.

WILLIAM GRUBB TURNER. [L. S.]

Witnesses:
E. W. BRADFORD,
CHAS. E. RIORDAN.